United States Patent Office 3,287,293
Patented Nov. 22, 1966

3,287,293
PROCESS FOR PREPARING COPOLYMERS FROM POLYESTERS CONTAINING POLYMERIZABLE GROUPS AND α,β-ETHYLENICALLY UNSATURATED COMPOUNDS AND PRODUCT
Horst Dalibor, Harksheide, near Hamburg, Germany, assignor to Reichhold Chemicals, Inc., White Plains, N.Y.
No Drawing. Filed Oct. 30, 1964, Ser. No. 407,874
Claims priority, application Germany, June 27, 1960, R 28,218
7 Claims. (Cl. 260—22)

The invention relates to a process for preparing copolymers that are made up of olefinically unsaturated compounds, aliphatic monocarboxylic acids, polyalcohols and dicarboxylic acids capable of undergoing copolymerization. These copolymers are compatible with aminoplasts.

The present application is a continuation-in-part of my application Serial Number 79,180, filed December 29, 1960, now abandoned.

It is known from U.S. Patent 2,647,093 that oil alkyds modified with methyl methacrylate are compatible with ureaformaldehyde resins and melamine-formaldehyde resins. According to the working examples, it is proposed to use for the preparation of the methyl methacrylate-modified oil alkyds an acrylate proportion that is not in excess of about one-third of the total quantity of the starting components. Lacquer films prepared from said oil alkyds and aminoplasts by baking thereof in accordance with known processes do not have the stability against solvents needed to meet modern requirements, particularly with respect to aromatics, as encountered for example in the automotive industry or in the manufacture of washing machines.

The present invention is directed particularly to the preparation of copolymers suitable for use as lacquer films and which possess sufficient solvent stability to meet all requirements as well as outstanding surface hardness. These problems could not be solved by the use of the means suggested in the aforesaid U.S. patent. Although it is possible to increase the solvent resistance of the enamels obtained in accordance with this known process, by raising the acrylate proportion in the alkyd resin, this was found, sooner or later, to cause incompatibility with the aminoplasts so that no real solution of the problem was presented.

The present invention now makes it possible to prepare resins of the aforesaid type having a predominant constituent part of acrylic groups, that are compatible with aminoplasts practically in all proportions and which, admixed therewith, yield upon hardening products of high solvent resistance and at the same time of high surface hardness and reduced thermoplasticity.

The process of the present invention is characterized in that the copolymers prepared therewith are those having preferably a high component part of olefinically unsaturated compounds, whereby a portion of these compounds contain reactive hydrogen.

The resins used in accordance and within the purview of the present invention, that are made up of aliphatic monocarboxylic acids, acrylic compounds, polyalchols and dicarboxylic acids, are suitable referred to as internally plasticized acrylate resins, so far as the acrylic component is predominant therein. It is possible to prepare these resins, which are compatible with urea and melamine resins, with an acrylate proportion up to 80% inclusive of any additional monomer component used if necessary.

The required quantity of reactive hydrogen atoms is available even in the case of olefinically unsaturated compounds having a small content of carboxyl, hydroxyl or amide groups.

The hardened products, particularly lacquer films, that can be prepared from the reaction products of the present invention, aside from the above mentioned advantages over the known products, are also distinguished by their superior fastness to light and high water and alkali stability.

The aliphatic monocarboxylic acids suitable for the preparation of acrylate resins in accordance with the present invention, are saturated or unsaturated fatty acids. As unsaturated fatty acids it is possible to use those having conjugated or isolated double bonds, such as castor oil fatty acids, eleosteric acid, linoleic acid, linolenic acid or their glycerides.

Moreover, it is possible to use as saturated or unsaturated dicarboxyl acids those generally used for the preparation of polyester resins, such as phthalic acids, maleic acid or their anhydrides, fumarc acid, sorbic acid, as well as polyalcohols such as glycols, glycerine or multivalent alcohols such as pentaerythritol.

Suitable copolymerization components are acrylic esters, as for example methyl-, ethyl-, isopropyl-, butyl-, actyl acrylate or 2-ethylhexyl acrylate, as well as methacrylic esters such as methyl-, ethyl-, propyl- or butyl-methacrylate or the esters of ethacrylic acid. As additional monomeric components capable of coplymerization may be mentioned for example styrene and substituted styrenes, for example vinyltoluene, α-methylstyrene, o- and p-methylstyrene and o,p-dimethylstyrene. Suitable compounds having reactive hydrogen atoms are acrylamides or the amides and partial amides of polyvalent acids, and also acrylic acid and methacrylic acid.

In accordance with the present invention, it is advantageous to use as olefinically unsaturated compounds having reactive hydrogen atoms also those having, aside from hydroxyl groups, ether radicals. Compounds of this type can be prepared by reacting unsaturated monoalcohols, for example allyl-, methallyl-, chloroallyl-, crotyl alcohol or methylvinyl carbinol with polyalcohols, such as glycerin, trimethylolethane, trimethylolpropane or pentaerythritol. Instead of hydroxyl groups-containing allyl ethers or the like it is possible to use those having epoxide groups, for example ether alcohols having glycidyl radical substituents that are known to react like dialcohols the hydroxyl groups of which are substituted at adjacent hydrocarbon atoms. As an example of this may be mentioned allylglycidyl ether.

As aminoplasts for admixture with the specified acrylates are suitable urea and melamine methylol compounds that are more or less etherified with monovalent alcohols as for example methanol, butanol or isobutanol.

Although the internally plasticized acrylate resins of the present invention can be used per se, i.e., without the addition of aminoplasts, for the preparation of products that are quite satisfactory, those prepared from mixtures within aminoplasts have been found particularly valuable.

PREPRODUCT 1.—PREPARATION OF A PLASTICIZED OIL-MODIFIED ALKYD RESIN

A mixture having the following components:

710 parts of castor oil fatty acid
235 parts of pentaerythritol
180 parts of ethylene glycol
515 parts of phthalic acid anhydride
25 parts of maleic acid anhydride
50 parts of p-tert.-butylbenzoic acid is held at a temperature of 180° C. until the acid number is 55. Upon addition of 80 parts of xylene esterification is carried out by recycling at a temperature from 180°

C. to 200° C. With an acid number of 28–30, the alkyd resin dissolved in xylene to the extent of 60% should have in a DIN-beaker at 20° C. a viscosity of 40–50 seconds.

*Example 1*

A mixture having the following components:

490 parts of preproduct 1, dissolved to the extent of 60% in xylene
395 parts of xylene
220 parts of styrene
50 parts of butylmethacrylate
25 parts of methacrylic acid
5.5 parts of di-tert.-butylperoxide is copolymerized for 2 hours at 130° C. The 50% solution of the reaction product in xylene has a Gardner-Holdt viscosity of V–W and an acid number of 40.

*Use of the copolymer prepared according to the invention.*—The copolymer is mixed with a butanol-modified melamine-formaldehyde resin in a ratio of 2:1 and yields upon baking at 120° C. valuable coatings which, aside from being very fast to light, are stable toward water, aqueous alkali and aromatics-containing solvents.

*Example 2*

A mixture having the following components:

369 parts of preproduct 1, dissolved to the extent of 80% in xylene
120 parts of xylene
60 parts of dimethylformamide
30 parts of methacrylamide
130 parts of methylmethacrylate
135 parts of styrene
5.5 parts of di-tert.-butylperoxide is polymerized for 2 hours at 130° C. until the solids content is 70%.

*Use of the copolymer according to the present invention.*—The reaction product is diluted with 340 parts of xylene and, after cooling to a temperature of 50° C., there are added 590 parts of a 50% solution of a melamine-formaldehyde resin etherified with butanol. A 50% solution of the resulting product has a Gardner-Holdt viscosity X and an acid number of 11. This copolymer yields, upon baking at 120° C., coatings having the same properties as in Example 1. At baking temperatures of 150° C. they become resistant toward acetone, diacetone alcohol and ethylglycol acetate.

*Example 3*

A mixture having the following components:

369 parts of preproduct 1, dissolved to the extent of 80% in xylene
120 parts of xylene
60 parts of dimethylformamide
30 parts of methacrylamide
30 parts of trimethylolpropanediallyl ether
135 parts of vinyl toluene
130 parts of methylmethacrylate
5.5 parts of di-tert.-butyl peroxide is polymerized for 2 hours at 130° C. until the solids content is 70%.

*Use of the copolymer according to the present invention.*—Upon dilution with xylene to a solids content of 50%, there are added at 50° C., while stirring, 590 parts of a 50% solution of a melamine-formaldehyde resin etherified with butanol. The viscosity of the 50% solution is 200 DIN-sec., the acid number being 11. This copolymer, after baking at 120° C. or 150° C., is distinguished by a resistance toward chemicals that is as good as that of the products obtained in accordance with Examples 1 and 2.

*Example 4*

A mixture having the following components:

394 parts of preproduct 1, dissolved to the extent of 60% in xylene
432 parts of xylene
269 parts of styrene
25 parts of methacrylic acid
60 parts of butylmethacrylate
5.5 parts of di-tert.-butyl peroxide is copolymerized for 2 hours at 130° C. The 50% solution of the reaction product in xylene has a Gardner-Holdt viscosity W–X and an acid number of 40.

*Use of the copolymer prepared in accordance with the invention.*—The aforesaid copolymer is mixed with butanol-modified melamine-formaldehyde resins in a ratio of 2:1. The mixture yields, upon baking at 120° C. or 150° C., coatings that have properties corresponding to those mentioned in Examples 1 and 2.

*Example 5*

A mixture having the following components:

197 parts of preproduct 1, dissolved to the extent of 60% in xylene
511 parts of xylene
367 parts of styrene
25 parts of methacrylic acid
80 parts of butylmethacrylate
5.5 parts of di-tert.-butyl peroxide is copolymerized at 130 C. for two hours. The 50% solution of the reaction product in xylene has a Gardner-Holdt viscosity Z and an acid number of 33.

*Use of the copolymer prepared in accordance with the invention.*—The aforesaid copolymer is mixed with butanol-modified etherified melamine-formaldehyde resins in a ratio of 2:1. The mixture yields, after baking at 120° C. or 150° C., coatings that have properties corresponding to those set forth in Examples 1 and 2.

The following Examples and illustrate the preparation of emulsions.

*Example 6*

A mixture having the following components:

369 parts of preproduct 1, dissolved to the extent of 80% in xylene
180 parts of toluene
275 parts of styrene
20 parts of methacrylic acid
5 parts of benzoyl peroxide is polymerized at 108–110° C. for 2 hours until the solids content amounts to 70%. After the polymerization has terminated there are added at 110° C. 60 parts of a non-ionic emulsifier, such as nonylphenoxypolyethoxyethanol containing about 30 oxyethylene units. The temperature is maintained at 110° C. for one hour. After cooling to 80° C., there are added, while vigorously stirring, 600 parts of water. The pH is thereupon adjusted to a value of 8.8 with the aid of aqueous ammonia of 25% concentration. The organic solvent is distilled off in a 40–50 mm. vacuum at 30–34° C. and replaced with water. The viscosity of the 40% emulsion corresponds to 500 centipoises. The pH value is adjusted with ammonia to 8.6.

*Use of the emulsified copolymer prepared in accordance with the invention.*—The above product is compatible with a water-soluble melamine-formaldehyde resin in a ratio of 5:2. A lacquer film prepared therewith is distinguished, upon baking at 120° C., by its great hardness and excellent resistance toward chemicals, as well as its outstanding gloss. It is resistant to water and aqueous alkali as well as gasolines and aromatics-containing solvents.

Example 7

A mixture having the following components:

185 parts of preproduct 1, dissolved to the extent of 80% in exylene
90 parts of toluene
68 parts of styrene
68 parts of methylmethacrylate
13 parts of methacrylic acid
5 parts of benzoyl peroxide is polymerized at 108–110° C. for 2 hours until the solids content amounts to 70%. At this point there are added 30 parts of nonylphenoxypolyethoxy-ethanol having about 30 oxyethylene units whereupon the mixture is cooled to 80° C. 300 parts of water are now added, while vigorously stirring, and the pH is adjusted with ammonia to a value of 8.6. The toluene is distilled off in a vacuum and replaced with water. The viscosity of the 40% emulsion corresponds to 1150 centipoises, the pH value being 8.55.

*Use of the emulsified copolymer prepared in accordance with the invention.*—The copolymer is compatible with water-soluble methanol-modified melamine-formaldehyde resin in a ratio of 5:2 and yields coatings having properties corresponding to those described in Example 6.

PREPRODUCT 2.—PREPARATION OF A PLASTICIZED OIL-MODIFIED ALKYD RESIN

A mixture having the following components:

520 parts of lauric acid
220 parts of pentaerythritol
160 parts of ethylene glycol
515 parts of phthalic acid anhydride
25 parts of maleic acid is held at a temperature of 180° C. until the acid number 40 is reached. After adding 70 parts of xylene the whole is esterified by recycling at a temperature of 180° C. to 200° C. With an acid number of 28–30, the alkyd resin dissolved in xylene to the extent of 60% should have in a DIN-beaker at 20° C. a viscosity of 30 to 40 seconds.

Example 8

A mixture having the following components:

248 parts of preproduct 2, dissolved in xylene to the extent of 60%
180 parts of butanol
310 parts of xylene
277 parts of styrene
90 parts of butylmethacrylate
25 parts of methacrylic acid
50 parts of trimethylolpropanediallyl ether
10 parts of benzoyl peroxide is copolymerized at 110° C. to 120° C. for 2 hours. The 50% solution of the reaction product has a Gardner-Holdt viscosity U–V and an acid number of 38.

*Use of the emulsified copolymer prepared in accordance with the invention.*—The above copolymer is mixed with butanol-modified melamine-formaldehyde resins in a ratio of 2:1 and yields, after baking at 120° C., valuable coatings which, aside from being fast to light, are resistant to water, aqueous alkali and aromatics-containing solvents.

PREPRODUCT 3

1065 parts by weight castor oil fatty acid
345 parts by weight pentaerythritol
270 parts by weight ethylene glycol
773 parts by weight phthalic acid anhydride
25 parts by weight maleic acid anhydride are slowly esterified at 180° C. to an acid number of 50–60 and thereupon esterified in a 93% xylene recycle at a temperature up to about 200° C. and an acid number of 20–25. The viscosity is of the order of about 40–60 DIN sec. at 20° C. to the extent of 60% in xylene.

Example 9

428 parts by weight castor oil-alkyd preproduct (as a 60% xylene solution) and
457 parts by weight xylene are heated in a flask provided with a stirrer, reflux cooler and water separator, to a temperature of 130° C.

A mixture consisting of:

14 parts by weight methacrylic acid
140 parts by weight butylacrylate
140 parts by weight methylmethacrylate and
5 parts by weight benzoyl peroxide is then run in during about 2–3 hours to a temperature of 125–130° C. After 2 more hours the solids content of the solution is about 48–50%. The viscosity is about 200–300 DIN sec.

Example 10

635 parts by weight castor oil-alkyd preproduct 3 (69.0% xylene solution) and 398 parts by weight xylene are heated at 130–140° C. in a flask provided with a stirrer and reflux cooler. 20 gr. of maleic acid are added and then is started immediately the uniform introduction, within 2 hours, of a mixture consisting of 128 parts of methylmethacrylate and 5 parts by weight benzoyl peroxide. After 2 additional hours the solids content of the solution amounted to about 43%. Upon further addition of 6 gr. of benzoyl peroxide and maintaining the temperature, it is possible to arrive at a solids content of about 48%. The viscosity of the 48% solution was found to be about 40–50 DIN sec. at 20° C.

*Preparation of the masses set forth in Table 1.*—The masses used for comparison purposes, as set forth in Table 1, were pigmented and mixed with melamine resins as follows:

25 parts by weight melamine-formaldehyde resin in the form of a 50% solution
33 parts by weight titanium dioxide known as RN 56
0.5 part by weight silicone oil AL amounting to 1%
75 parts by weight of the copolymers I to IV mentioned in Table 1 (50% solutions)

are mixed for 36 hours in a ball mill and diluted with 19 parts by weight of a solvent mixture consisting of 60 parts xylene, 20 parts diacetone alcohol and 20 parts ethylene glycol to a viscosity of 20—20 DIN sec., useful for spraying purposes, and thereupon applied to a clean iron sheet by means of a spray gun. After a short period of ventilating, the coated sheet is baked for 30 minutes at 120° C. and then subjected to the tests indicated.

*Preparation of the masses set forth in Table 2.*—The comparative test masses set forth in Table 2 were pigmented and mixed with melamine resins as follows:

40 parts by weight melamine-formaldehyde resin in the form of a 50% solution
40 parts by weight titanium dioxide known as RN 56
0.5 part by weight silicone oil AL amounting to 1%
80 parts by weight of the copolymers I to IV mentioned in Table 2 (50% solutions)

are mixed for 36 hours in a ball mill and diluted with 10 parts by weight of the above solvent mixture to a viscosity of 20–22 DIN sec., useful for spraying purposes, and thereupon applied to a clean iron sheet with the aid of a spray gun in 1½ crosswise passes and, after a short ventilating period the coated sheet is baked for 30 minutes at 120° C. and then subjected to the tests indicated.

TABLE 1

| Comparative test masses Copolymers | Gloss | Depth on impact according to Erickson | Filling capacity of lacquers | Stabilities Against distilled water | Stabilities Against 3% caustic lye |
|---|---|---|---|---|---|
| I. Example 1 according to invention. | 1 | 5.6 mm | 1 | [1] 1 | [1] 1 |
| II. Example 9 according to invention. | 1 | 6.7 mm | 1 | [1] 1–2 | [1] 1–2 |
| III. Example 1 according to Belgian Patent 576,209. | 3 | 0.4 mm | 4 | [1] 2–3 | [1] 2–3 |
| IV. Example 1 according to French Patent 1,180,231. | 3 | 1.3 mm | 3 | [2] 4 | [3] 4 |

[1] After 24 hours.
[2] After 6 hours.
[3] After 50 minutes.

TABLE 2

| Comparative test masses | Gloss | Depth Impact according to Erickson | Filling capacity of lacquers | Stabilities Against distilled water | Stabilities Against 3% caustic lye |
|---|---|---|---|---|---|
| I. Example 1 according to invention. | 1 | 4.0 mm | 1 | [1] 1 | [1] 1 |
| II. Example 9 according to invention. | 1 | 9.2 mm | 1 | [1] 1 | [1] 1–2 |
| III. Example 1 according to Belgian Patent 576,209. | 3 | 0.2 mm | 4 | [1] 2 | [1] 2 |
| IV. Example 1 according to French Patent 1,180,231. | 4 | 1.0 mm | 3 | [1] 4 | [2] 4 |

[1] After 24 hours.
[2] After 60 minutes.

Explanation of numbers:
Gloss—1=good gloss; 2=gloss with haze; 3=strong haze formation; 4=dull.
Filling capacity—1=fully filled glossy films; 2=fully filled films with haze formation; 3=sparse films with haze formation; 4=sparse and dull films.
Stabilities against distilled water and 3% caustic lye; 1=no blisters; 2=few blisters; 3=strong blister formation; 4=film destroyed.

The above comparative tests show that the coating masses according to the invention are distinguished from similar products according to Belgian Patent No. 576,209 and French Patent No. 1,180,231 by a superior gloss, greater elasticity (depth on impact according to Erickson), greater filling capacity, better stability against water and lye. It is therefore apparent that the improvement of the coating masses according to the present invention could not have been foreseen in many respects.

I claim:
1. Process for preparing copolymers from polyesters containing polymerizable group and $\alpha,\beta$-ethylenically unsaturated compounds, characterized in that
   (a) polyesters, obtained from aliphatic monocarboxylic acids, polyalcohols and dicarboxylic acids, are copolymerized with
   (b) mixtures consisting of (1) olefinically unsaturated compounds that have no reactive hydrogen atoms and (2) olefinically unsaturated compounds that have reactive hydrogen atoms, wherein the olefinically unsaturated compounds (2) contain unsaturated ether radicals in addition to hydroxyl groups.
2. Process according to claim 1, characterized by an addition of condensation products of ethylene oxide-containing compounds and alkyl phenols, that have between 4 and 30 oxyethylene units.
3. A process according to claim 1 wherein the olefinically unsaturated component (2) includes ethers which contain beside hydroxyl groups, unsaturated ether radicals obtained by etherification of methylvinylcarbinol with a polyalcohol selected from a group consisting of glycerine, trimethylolethane, trimethylol propane and pentaerythritol.
4. A process according to claim 1 wherein the olefinically unsaturated components (2) includes allyl glycidyl ether.
5. A process according to claim 1 wherein the olefinically unsaturated compound having hydroxyl groups includes allyl ether.
6. A process according to claim 5 wherein the allyl ether is obtained by reacting at least one member of the group consisting of allyl, methallyl, chlorallyl and crotyl-alcohol with polyalcohols selected from a group consisting of glycerine, trimethylol propane, triethylol ethane and pentaerythritol.
7. The product produced by the process of claim 1.

References Cited by the Examiner

UNITED STATES PATENTS

| 2,647,093 | 7/1953 | Opp et al. | 260—22 |
| 2,939,854 | 6/1960 | Christenson | 260—22 |
| 3,052,659 | 9/1962 | Woodruff | 260—22 |
| 3,163,615 | 12/1964 | Sekmakas | 260—22 |

FOREIGN PATENTS 1,180,231  6/1959  France.

LEON J. BERCOVITZ, *Primary Examiner.*
R. W. GRIFFIN, *Assistant Examiner.*